(12) United States Patent
Nagamura et al.

(10) Patent No.: US 9,334,628 B2
(45) Date of Patent: May 10, 2016

(54) MOTOR GRADER

(71) Applicant: KOMATSU LTD., Tokyo (JP)

(72) Inventors: Tomonao Nagamura, Komatsu (JP);
Tetsuya Morimoto, Nomi (JP);
Michihiro Aida, Komatsu (JP)

(73) Assignee: KOMATSU LTD., Tokyo (JP)

( * ) Notice: Subject to any disclaimer, the term of this patent is extended or adjusted under 35 U.S.C. 154(b) by 111 days.

(21) Appl. No.: 14/363,517

(22) PCT Filed: Dec. 21, 2012

(86) PCT No.: PCT/JP2012/083213
§ 371 (c)(1),
(2) Date: Jun. 6, 2014

(87) PCT Pub. No.: WO2013/111486
PCT Pub. Date: Aug. 1, 2013

(65) Prior Publication Data
US 2014/0345890 A1 Nov. 27, 2014

(30) Foreign Application Priority Data
Jan. 23, 2012 (JP) ................. 2012-011085

(51) Int. Cl.
*B60K 31/00* (2006.01)
*E02F 9/22* (2006.01)
(Continued)

(52) U.S. Cl.
CPC .............. *E02F 9/2253* (2013.01); *B60K 31/00* (2013.01); *B60W 10/02* (2013.01); *B60W 10/04* (2013.01);
(Continued)

(58) Field of Classification Search
CPC ........ B60K 6/46; B60K 10/06; B60K 10/105; B60K 30/188; B60K 31/00; B60T 7/042; B60T 7/122; B60T 13/662; B60W 10/182; B60W 10/184; B60W 10/103; B60W 30/18027; B60W 10/02; B60W 10/06; B60W 10/11; B60W 10/04; B60W 30/14; F16H 59/0204; F16H 59/044; F16H 59/0217; F16H 59/105; F16H 59/02; F16H 59/10; F16H 47/04; F16H 61/686; F16H 61/70; F16H 61/00; F16H 61/02; F16H 61/0059; F16H 63/50; E02F 9/2253; E02F 3/84; E02F 3/7636; E02F 9/202; E02F 9/2292; E02F 9/2296; F02D 29/04; F02D 29/02
USPC ............ 475/73, 123; 477/34, 71, 86, 92, 174, 477/176; 701/12, 50, 51, 58, 67, 70
See application file for complete search history.

(56) References Cited

U.S. PATENT DOCUMENTS

| | | | | | |
|---|---|---|---|---|---|
| 5,351,570 | A | * | 10/1994 | Mizunuma | .......... F16H 59/0204 475/123 |
| 7,854,681 | B2 | * | 12/2010 | Sopko | ..................... B60K 6/46 477/34 |
| 8,758,181 | B2 | * | 6/2014 | Calvert | ................... F16H 47/04 475/73 |

FOREIGN PATENT DOCUMENTS

| | | |
|---|---|---|
| JP | 59-126044 A | 7/1984 |
| JP | 2001-114084 A | 4/2001 |
| JP | 2002-295528 A | 10/2002 |

OTHER PUBLICATIONS

The International Search Report for the corresponding international application No. PCT/JP2012/083213, issued on Jan. 22, 2013.

*Primary Examiner* — Robert Pezzuto
(74) *Attorney, Agent, or Firm* — Global IP Counselors, LLP

(57) ABSTRACT

A motor grader is provided with an engine, front and rear travel wheels, a transmission, a work implement, a control unit, and a vehicle speed adjusting knob. The transmission has hydraulic clutches for switching between forward and reverse travel and for switching between speed stages. The transmission changes the speed of power from the engine, and transmits the power to either the front travel wheels and/or to the rear travel wheels. The work implement includes a blade for grading. During travel at a forward first speed, the control unit causes one of the hydraulic clutches of the transmission to operate as a braking clutch such that the motor grader travels at a very low speed. The vehicle speed adjusting knob is a member for setting the vehicle speed during very low-speed travel to an arbitrary speed.

14 Claims, 11 Drawing Sheets

(51) Int. Cl.
- *B60W 10/02* (2006.01)
- *B60W 10/06* (2006.01)
- *B60W 10/11* (2012.01)
- *E02F 3/84* (2006.01)
- *E02F 9/20* (2006.01)
- *F16H 61/00* (2006.01)
- *B60W 10/04* (2006.01)
- *B60W 30/14* (2006.01)
- *F16H 61/02* (2006.01)
- *F16H 63/50* (2006.01)
- *E02F 3/76* (2006.01)
- *F02D 29/04* (2006.01)
- *F02D 29/02* (2006.01)

(52) U.S. Cl.
CPC ............... *B60W 10/06* (2013.01); *B60W 10/11* (2013.01); *B60W 30/14* (2013.01); *E02F 3/7636* (2013.01); *E02F 3/84* (2013.01); *E02F 9/202* (2013.01); *E02F 9/2292* (2013.01); *E02F 9/2296* (2013.01); *F02D 29/04* (2013.01); *F16H 61/00* (2013.01); *F16H 61/0059* (2013.01); *F16H 61/02* (2013.01); *F16H 63/50* (2013.01); *B60Y 2200/411* (2013.01); *F02D 29/02* (2013.01)

MOTOR GRADER

CROSS-REFERENCE TO RELATED APPLICATIONS

This application is a U.S. National stage application of International Application No. PCT/JP2012/083213, filed on Dec. 21, 2012. This U.S. National stage application claims priority under 35 U.S.C. §119(a) to Japanese Patent Application No. 2012-011085, filed in Japan on Jan. 23, 2012, the entire contents of which are hereby incorporated herein by reference.

BACKGROUND

1. Field of the Invention

The present invention relates to a motor grader and in particular to a very low-speed travel control device thereof.

2. Background Information

A motor grader is a work vehicle used for works, such as grading road surfaces and ground surfaces and removing snow, and is provided with an engine, front and rear travel wheels, a work implement including a blade and the like, and a power transmission mechanism that includes a torque converter and a transmission. The transmission is provided with a plurality of speed stages, and switching between the speed stages is conducted by manual gear shifting or a combination of manual and automatic gear shifting.

Precise finishing work may be conducted with this type of motor grader by reducing the travel speed to a very low-speed of about 1 km/h, which is lower than a forward 1 speed. Conventionally, a double engagement clutch is used when traveling at a very low speed.

For example, very low-speed travel that is lower than the forward 1 speed is made possible by causing a reverse clutch to function as a braking clutch by causing the reverse clutch to be engaged while traveling at the forward 1 speed (see Japanese Laid-open Patent No. 2002-295528).

SUMMARY

Only one type of vehicle speed can be set as the vehicle speed during very low-speed travel in the conventional motor grader. For example, if 0.8 km/h is set as the set vehicle speed, the vehicle speed is controlled to remain within a range of 0.6 to 1.0 km/h as a target vehicle speed.

However, a suitable vehicle speed during motor grader work may differ according to the purpose of the work and the conditions of the work site. Establishing the suitable speed is difficult when performing work during very low-speed travel with only one vehicle speed as in the conventional motor grader.

Furthermore, the engine revolutions per minute (rpm) during the very low-speed travel is fixed to a low idle rpm in the conventional motor grader. Under such conditions, the vehicle speed falls when climbing a slope under the very low-speed travel and the set vehicle speed cannot be obtained, which leads to a reduction in work efficiency.

An object of the present invention is to configure a motor grader so that, when working during very low-speed travel, the motor grader can perform the work at an appropriate vehicle speed depending on the conditions.

Another object of the present invention is to enable a set vehicle speed and a sufficient tractive force to suppress a reduction in work efficiency even when a load increases, such as when climbing a slope while the motor grader is traveling at a very low speed.

A motor grader according to a first aspect of the present invention is provided with an engine; front and rear travel wheels; a transmission that has hydraulic clutches for switching between forward and reverse travel and for switching between speed stages, which changes speed stages of a motive force, and that transmits the motive force to at least one of the front and rear travel wheels; a work implement that includes a blade for grading; a very low-speed controlling means; and a very low-speed adjusting member. During travel at a forward first speed, the very low-speed controlling means causes one of the hydraulic clutches of the transmission to operate as a braking clutch to enable the motor grader to travel at a very low speed. The very low-speed adjusting member is a member for setting a vehicle speed during very low-speed travel to an arbitrary vehicle speed.

The vehicle speed during very low-speed travel can be set to an arbitrary vehicle speed with the very low-speed adjusting member. Therefore, a suitable speed can always be obtained in accordance with the work conditions.

The motor grader according to a second aspect of the present invention is related to the motor grader of the first aspect, wherein the very low-speed controlling means causes a reverse hydraulic clutch to operate as the braking clutch.

During the very low-speed travel in the forward 1 speed, the output side members of the reverse hydraulic clutch are rotated for the hydraulic clutch engaged in the forward 1 speed to the opposite direction. Therefore, the reverse clutch can be made to function as the braking clutch by causing the clutch engaged for the forward 1 speed and the reverse clutch to enter double engagement.

In this case, because the difference in the relative rpm between the forward 1 speed clutch and the reverse hydraulic clutch is large, a large braking effect can be obtained with low oil pressure.

The motor grader according to a third aspect of the present invention is related to the motor grader of the first aspect, wherein the transmission has a forward low-speed hydraulic clutch and a forward high-speed hydraulic clutch. The very low-speed controlling means causes the forward low-speed hydraulic clutch and a hydraulic clutch for switching between speed stages to become engaged and causes the forward high-speed hydraulic clutch to operate as the braking clutch when traveling at a forward 1 speed.

The output side members of the forward high-speed hydraulic clutch rotate at a lower rpm than the rotation speed of the forward 1 speed clutch when the forward low-speed hydraulic clutch and the hydraulic clutch for switching between speed stages are engaged when traveling at the very low-speed in the forward 1 speed. Therefore, the forward high-speed hydraulic clutch can be made to function as the braking clutch by causing the forward 1 speed clutch and the forward high-speed hydraulic clutch to enter double engagement.

In this case, because the difference between the relative rpm of the forward 1 speed clutch and the forward high-speed hydraulic clutch is relatively small, the difference in the braking force with respect to a change in the oil pressure is relatively small. Therefore, the control of the oil pressure supply to the braking clutch is simple and does not require precise management.

The motor grader according to a fourth aspect of the present invention is related to the motor grader of any of the first to third aspects, wherein the motor grader is further provided with a vehicle speed sensor for detecting a vehicle speed. The very low-speed controlling means controls the supply oil pressure to the braking clutch, on the basis of a detection result by the vehicle speed sensor, so that the vehicle speed becomes a target vehicle speed within a prescribed range that includes a set vehicle speed set with the very low-speed adjusting member.

In this case, the supply oil pressure to the braking clutch is controlled so that the vehicle speed falls within the range of the target vehicle speed having a certain vertical breadth with respect to the set vehicle speed set by the very low-speed adjusting member. Therefore, control is facilitated.

The motor grader according to a fifth aspect of the present invention is related to the motor grader of the fourth aspect, wherein the very low-speed controlling means causes an engine rpm to rise when the vehicle speed does not meet the target vehicle speed even when the supply oil pressure to the braking clutch is equal to or less than a certain oil pressure.

The vehicle speed may not meet the target vehicle speed even when the supply oil pressure to the braking clutch is equal to or less than the certain oil pressure and the braking force is small during the very low-speed control while, for example, climbing a slope or while the work load is large.

In such a case, the vehicle speed is increased by raising the engine rpm. Therefore, the vehicle speed can meet the target vehicle speed during the very low-speed control while climbing a slope. Further, a loss of tractive force while climbing a slope can be suppressed.

The motor grader according to a sixth aspect of the present invention is related to the motor grader of the fifth aspect, wherein the very low-speed controlling means causes the engine rpm to rise when the vehicle speed does not meet the target vehicle speed within a certain processing time period even if the supply oil pressure to the braking clutch is equal to or less than the certain oil pressure.

Similar to the motor grader of the fifth aspect, the engine rpm is raised after a certain processing time period has elapsed when the vehicle speed does not meet the target vehicle speed even when the braking force is small. Therefore, the vehicle speed can meet the target vehicle speed during the very low-speed control while climbing a slope.

In the above present invention, work can be performed in the motor grader at a suitable vehicle speed in accordance with the work conditions during a very low-speed travel. In another invention, a set vehicle speed can be obtained and a loss of tractive force can be prevented and a reduction in work efficiency can be suppressed even when a large load exists while the motor grader is traveling at a very low speed.

DESCRIPTION OF EXEMPLARY EMBODIMENTS

Overall Configuration

Figure 1:
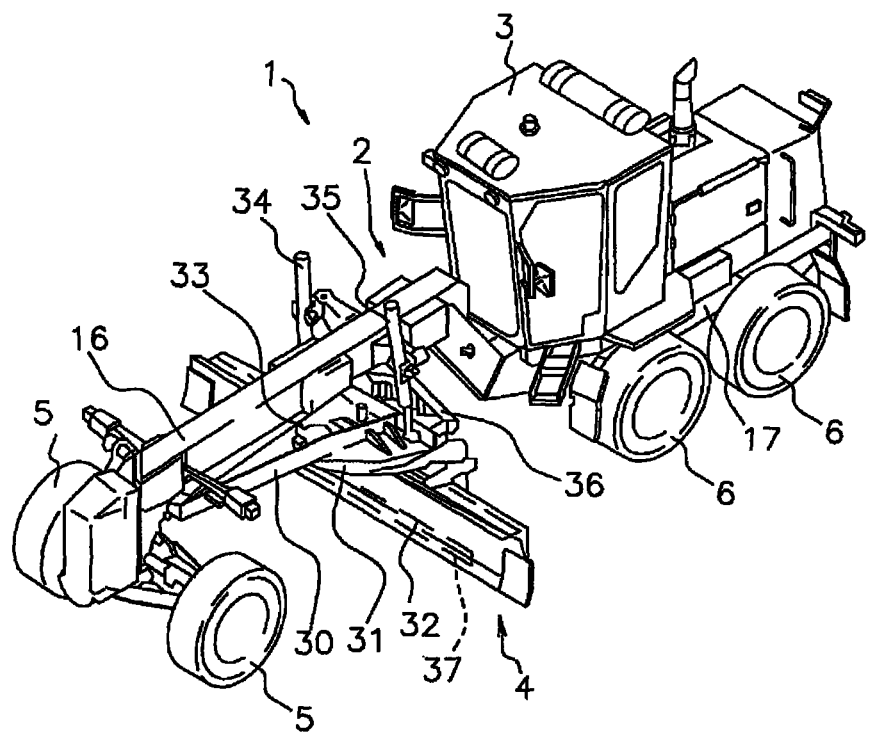
FIG. 1 is an external perspective view of a motor grader.
Figure 2:
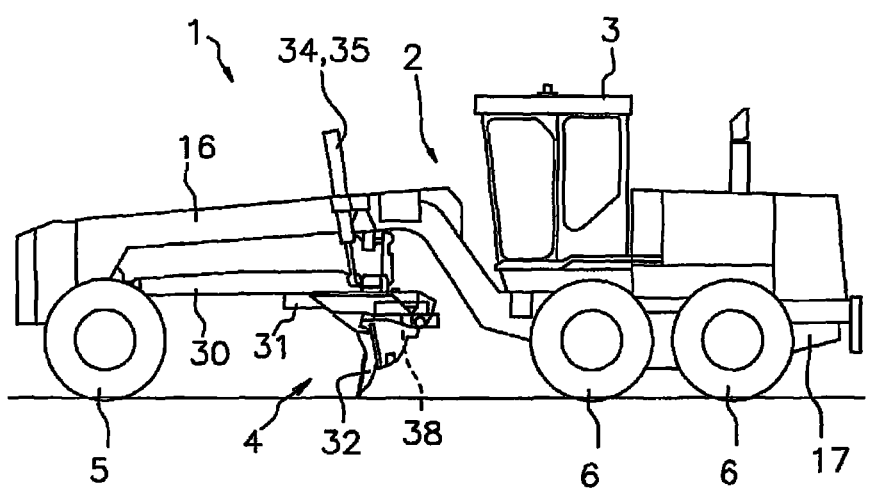
FIG. 2 is a side view of a motor grader.
Figure 3:
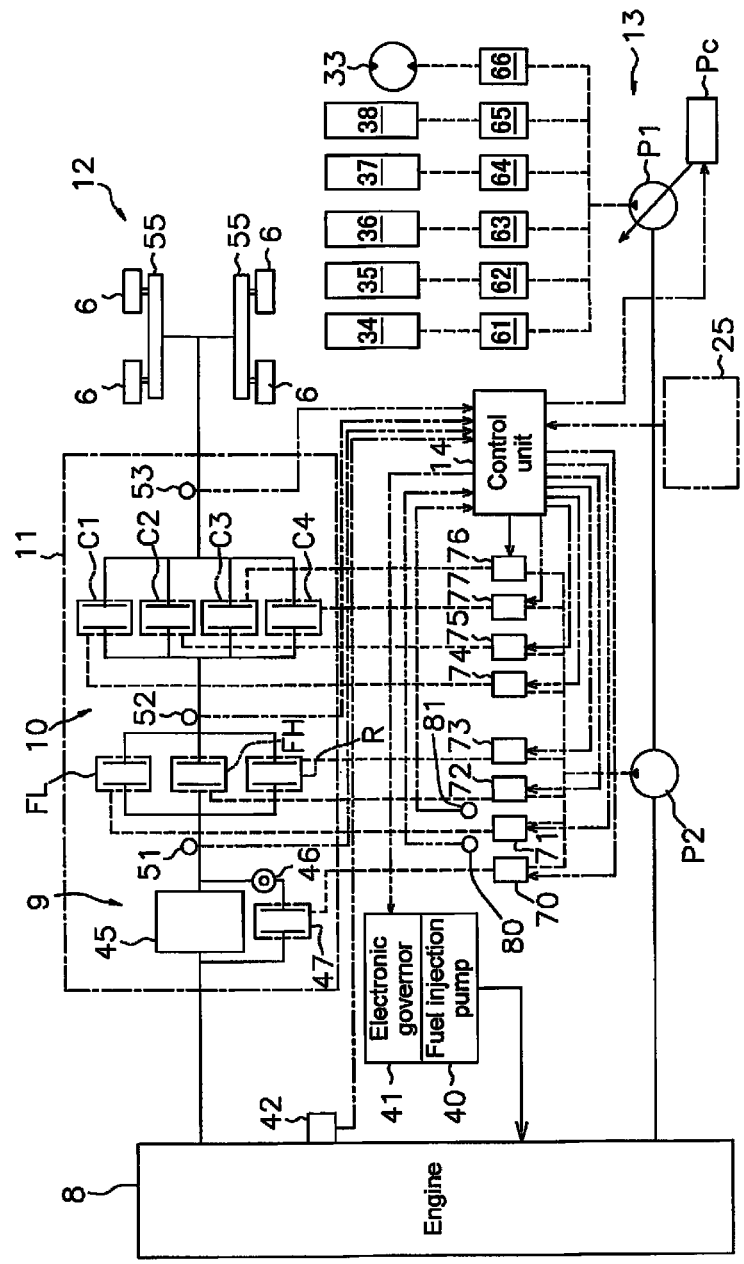
FIG. 3 is a block diagram depicting a configuration of a motor grader.

An external perspective view and a side view of a motor grader 1 according to an exemplary embodiment of the present invention are illustrated respectively in FIG. 1 and FIG. 2. The motor grader 1 is a vehicle for conducting work, such as grading, snow removal, light cutting, material mixing, and so on. The motor grader 1 is equipped with a frame 2, an operating cabin 3, a work implement 4, a pair of front wheels 5, and two rear wheels 6 on either side of the vehicle. Moreover, the motor grader 1 is equipped with an engine 8, a power transmission mechanism 11 that includes a torque converter 9 and a transmission 10, a travel mechanism 12, a hydraulic drive mechanism 13, and a control unit 14 as illustrated in FIG. 3.

Frame 2 and Operating Cabin 3

The frame 2 is configured of a forward frame 16 and a rear frame 17 as illustrated in FIGS. 1 and 2.

The rear frame 17 contains the engine 8, the power transmission mechanism 11, and the hydraulic drive mechanism 13 and the like. The rear wheels 6 are provided on the rear frame 17 and are driven by driving force from the engine 8.

The forward frame 16 is provided in front of the rear frame 17 and the front wheels 5 are provided on a front end part of the forward frame 16.

Figure 4:
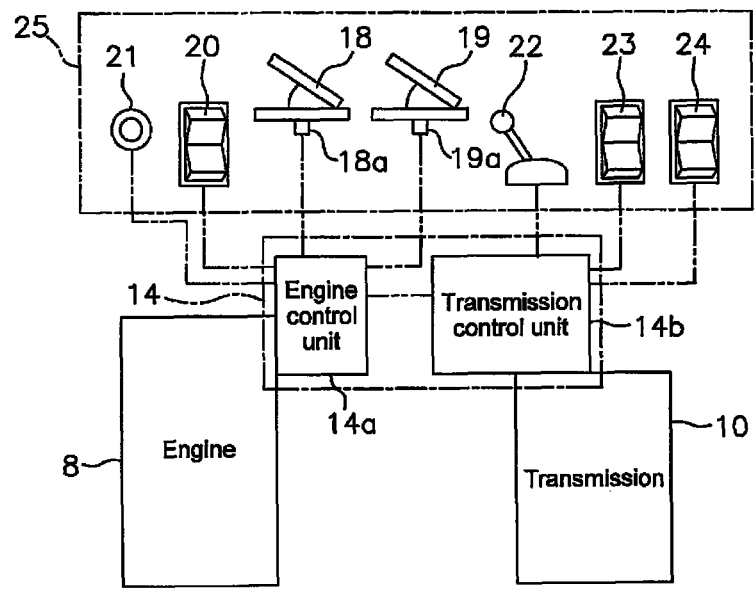
FIG. 4 is a block diagram depicting a control unit and an operating unit of a motor grader.

The operating cabin 3 is mounted on the rear frame 17 and a handle, a shift lever, an operating lever for the work implement 4, and operating units, such as a brake and an accelerator pedal, are provided inside the operating cabin 3. FIG. 4 illustrates a portion of the operating units 25.

The operating units 25 are parts operated by an operator for controlling the work implement 4 and the travel of the motor grader 1. The operating units 25 include operating members such as an accelerator pedal 18, an inching pedal 19, an engine mode switch 20, a dial-type vehicle speed adjusting knob 21, a shift lever 22, a transmission mode switch 23, and a lock-up switch 24 as illustrated in an enlargement in FIG. 4.

The accelerator pedal 18 is a member for setting the engine rpm to a desired rpm. A sensor 18a is provided on the accelerator pedal 18 for detecting a pressing amount, which is an accelerator opening degree, of the accelerator pedal 18. The inching pedal 19 is a member operated when conducting an inching operation. A sensor 19a is provided on the inching pedal 19 for detecting a pressing amount. The engine mode switch 20 is a switch for switching engine operating modes between an economy mode that focuses on fuel consumption saving and a power mode that focuses on power. The vehicle speed adjusting knob 21 is a member for setting the vehicle speed during very low-speed travel, and allows the vehicle speed to be set to any vehicle speed equal to or below a forward 1 speed vehicle speed (for example, 1.3 km/h) at a low idle rpm. Moreover, a very low-speed control is started by pressing the vehicle speed adjusting knob 21. Specifically, the vehicle speed adjusting knob 21 is a start button for the very low-speed control.

Further, the shift lever 22 is an operating unit for changing the speed stages of the transmission 10 and allows for the selection of speed stages such as forward F1 to F8 and reverse R1 to R4 in response to the position of the shift lever 22. The transmission mode switch 23 is a switch for changing the speeds of the transmission 10 to a manual gear shifting mode or to an automatic gear shifting mode. The lock-up switch 24 is a switch for selecting whether to transmit motive force from the engine 8 to the transmission 10 through a below mentioned torque converter unit or through a lock-up clutch.

When the operating members of the operating unit 25 are operated, operation signals corresponding to the operations thereof are sent to the control unit 14.

Work Implement 4

The work implement 4 has a drawbar 30, a circle 31, a blade 32, a hydraulic motor 33, and various types of hydraulic cylinders 34 to 38.

A front end part of the drawbar 30 is provided in a manner that enables swinging at the front end part of the forward frame 16, and a rear end part of the drawbar 30 is moved up and down due to the synchronized extension and contraction of the pair of lift cylinders 34 and 35. Moreover, the drawbar 30 swings up and down relative to an axis in the vehicle forward direction due to the differential extension and contraction of the lift cylinders 34 and 35. The drawbar 30 moves to the left and right due to the extension and contraction of the drawbar shift cylinder 36.

The circle 31 is attached in a rotatable manner at the rear end part of the drawbar 30. The circle 31 is driven by the hydraulic motor 33 (see FIG. 1) and rotates in the clockwise direction or the anti-clockwise direction relative to the drawbar 30 as seen from above the vehicle.

The blade 32 is supported in a manner that enables sliding in the horizontal direction with respect to the circle 31 and in a manner that allows swinging up and down relative to an axis parallel to the horizontal direction. The horizontal direction herein signifies the left-right direction with respect to the forward direction of the vehicle. The blade 32 can be moved in the horizontal direction relative to the circle 31 due to the blade shift cylinder 37 supported on the circle 31. The blade 32 can swing relative to the axis parallel to the horizontal direction with respect to the circle 31 to change the orientation of the blade 32 in the vertical direction due to the tilt cylinder 38 (see FIG. 2) supported by the circle 31. As described above, the blade 32 is able to move up and down with respect to the vehicle, change the inclination thereof with respect to the forward direction, change the inclination thereof with respect to the horizontal direction, rotate, and shift in the left-right direction via the circle 31.

The hydraulic motor 33 is driven by pressure oil supplied by a below-mentioned first hydraulic pump and the circle 31 is driven by the hydraulic motor 33.

Engine 8

As illustrated in FIG. 3, a fuel injection pump 40 is attached to the engine 8 and fuel is supplied to the engine 8 by the fuel injection pump 40. The supply amount of fuel is controlled by command signals outputted to an electronic governor 41 from the below mentioned control unit 14. The rpm of the engine 8 is detected by an engine rpm sensor 42 and sent to the control unit 14 as a detection signal. The control unit 14 is able to control the rpm of the engine 8 by controlling the supply amount of fuel to the engine 8 by sending command signals to the electronic governor 41.

Power Transmission Mechanism 11

The power transmission mechanism 11 is a mechanism for transmitting driving force from the engine 8 to the rear wheels 6, and, as described above, has the torque converter 9 and the transmission 10.

The torque converter 9 is arranged between the engine 8 and the transmission 10. The torque converter 9 has a torque converter body 45 and a lock-up clutch 47 having a damper mechanism 46. When the lock-up clutch 47 is in a connected state, members of the input side of the torque converter 9 and the input shaft of the transmission 10 are connected and the driving force from the engine 8 is transmitted to the transmission 10 without passing through the torque converter body 45. When the lock-up clutch 47 connection is released, the driving force from the engine 8 is transmitted to the transmission 10 through the torque converter body 45.

The transmission 10 has a plurality of hydraulic clutches and a plurality of shift gears (not illustrated). More specifically, the transmission 10 has a forward low-speed clutch FL, a forward high-speed clutch FH, and a reverse clutch R as forward-reverse shifting clutches, and a first clutch C1, a second clutch C2, a third clutch C3, and a fourth clutch C4 provided in association with each of the speed stages. When traveling forward, speed levels of speeds 1 to 8 can be selected according to combinations of any of the forward low-speed and forward high-speed clutches FL and FH with any of the first clutch C1 to the fourth clutch C4. When traveling in reverse, speed levels of speeds 1 to 4 can be selected according to combinations of the reverse clutch R with any of the first clutch C1 to the fourth clutch C4.

The input shaft rpm, a countershaft rpm, and an output shaft rpm for the forward-reverse shifting clutches are detected respectively by an input shaft rpm sensor 51, a countershaft rpm sensor 52, and an output shaft rpm sensor 53. The vehicle speed is derived from the detection result of the output shaft rpm sensor 53.

Travel Mechanism 12

The travel mechanism 12 has a final speed reduction gear (not illustrated), a tandem device 55, and the rear wheels 6, and receives driving force from the engine 8 through the power transmission mechanism 11. The driving force outputted by the transmission 10 is transmitted to the rear wheels 6 through the final speed reduction gear and the tandem device 55 so that the rear wheels 6 are rotated.

Hydraulic Drive Mechanism 13

The hydraulic drive mechanism 13 is a mechanism for generating oil pressure due to the driving force from the engine 8 and using the oil pressure to drive the clutches FL, FH and C1 to C4, the hydraulic motor 33, and the cylinders 34 to 38. The hydraulic drive mechanism 13 has a first hydraulic pump P1, a second hydraulic pump P2, and various hydraulic pressure control valves 61 to 66 and 70 to 77.

The first hydraulic pump P1 is driven by driving force from the engine 8 to generate oil pressure to be supplied to the cylinders 34 to 38 and to the hydraulic motor 33. The first hydraulic pump P1 is a variable displacement pump, and a tilt angle of a skew plate is changed by a pump capacity control cylinder Pc so that the capacity of pressure oil to be discharged can be changed.

The second hydraulic pump P2 is driven by driving force from the engine 8 to generate oil pressure to be supplied to the clutches FL, FH, and C1 to C4.

The first to fifth cylinder control valves 61 to 65, the hydraulic motor control valve 66, the lock-up clutch control valve 70, and first to seventh clutch control valves 71 to 77 are electromagnetic proportional control valves, and are electronically controlled by the control unit 14 to regulate the oil pressure. The first to fifth cylinder control valves 61 to 65 regulate the oil pressure supplied to the cylinders 34 to 38. The oil pressure supplied to the cylinders 34 to 38 is detected by a hydraulic pressure sensor (not illustrated) and sent to the control unit 14 as detection signals. The hydraulic motor control valve 66 regulates the oil pressure supplied to the hydraulic motor 33. The lock-up clutch control valve 70 regulates the oil pressure supplied to the lock-up clutch 47. The first to seventh clutch control valves 71 to 77 regulate the oil pressure supplied to the clutches FL, FH, and C1 to C4.

The oil pressure supplied to the clutches is detected by the hydraulic pressure sensor and sent to the control unit 14 as detection signals. Only a hydraulic pressure sensor 80 for detecting the oil pressure supplied to the forward low-speed clutch FL and a hydraulic pressure sensor 81 for detecting the oil pressure supplied to the forward high-speed clutch FH are depicted in FIG. 3, and other hydraulic pressure sensors are omitted.

Control Unit 14

The control unit 14 includes an engine control unit 14a and a transmission control unit 14b as illustrated in FIGS. 3 and 4, and the control unit 14 controls the units on the basis of the operation signals from the operating unit 25 and the detection signals from the sensors. The control unit 14 is able to control the work implement 4 by controlling the first to fifth cylinder control valves 61 to 65 and the hydraulic motor control valve 66.

The engine control unit 14a determines the supply amount of fuel to the engine 8 on the basis of an accelerator opening degree signal from the accelerator pedal 18 and the engine rpm detected by the engine rpm sensor 42. The engine control unit 14a then transmits a command signal in accordance with the determined supply amount to the electronic governor 41. As a result, the fuel injection amount from the fuel injection pump 40 is regulated to an amount that conforms to the operation amount of the accelerator pedal 18 and thus the engine rpm is controlled. The operator is able to control the output of the work implement 4 and the speed of the vehicle. Furthermore, the engine control unit 14a selectively switches the engine mode between the economy mode and the power mode on the basis of an operation signal from the engine mode switch 20.

The transmission control unit 14b transmits a command signal to the lock-up clutch control valve 70 and is able to switch the lock-up clutch 47 between an engaged condition and a non-engaged condition. The transmission control unit 14b selectively switches the gear shifting mode of the power transmission mechanism 11 between the manual gear shifting mode and the automatic gear shifting mode on the basis of an operation signal from the transmission mode switch 23. Moreover, the transmission control unit 14b is able to recognize an operating position of the shift lever 22 based on signals from the shift lever 22.

The engine control unit 14a and the transmission control unit 14b are able to conduct very low-speed control for conducting finishing work while traveling at a very low-speed that is lower than the vehicle speed in the forward 1 speed. The very low-speed control is described below.

Double Engagement Mode

To conduct very low-speed travel, it is necessary to establish a double engagement condition by engaging a hydraulic clutch located in portions that are rotating in reverse or at a rpm that is lower than the rotation speed in the forward 1 speed in addition to engaging the hydraulic clutch for the forward 1 speed when traveling at the forward 1 speed. The following three modes are examples of double engagement.

Example 1

Figure 5:
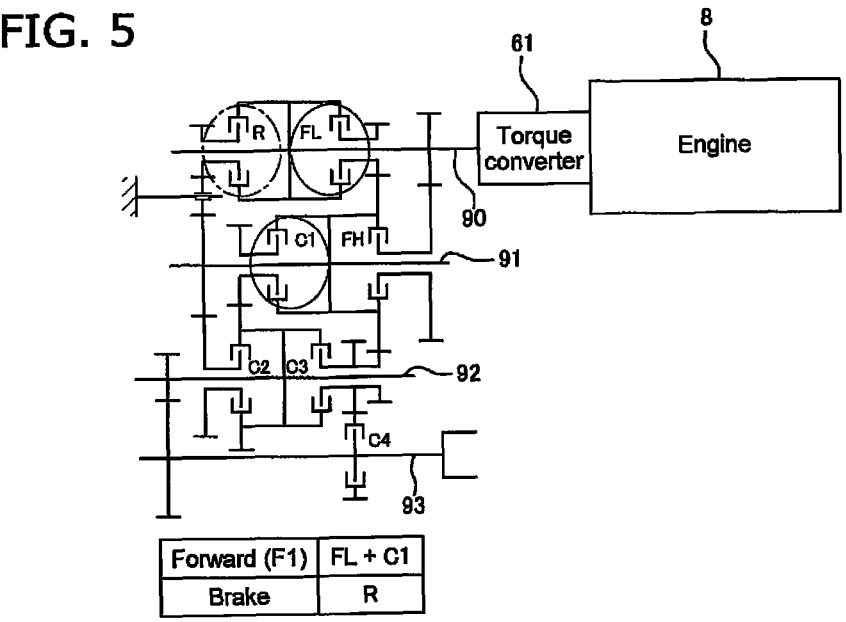
FIG. 5 illustrates a first aspect of a braking clutch.

The example in FIG. 5 depicts a more detailed configuration than that of the transmission 10 illustrated in FIG. 3. Specifically, the transmission 10 illustrated in FIG. 5 has the forward low-speed clutch FL, the forward high-speed clutch FH, and the reverse clutch R as the forward-reverse shifting clutches, and the first to fourth clutches C1 to C4 as speed stage switching clutches. The forward low-speed clutch FL and the reverse clutch R are arranged on an input shaft 90, the forward high-speed clutch FH and the first clutch C1 are arranged on a first countershaft 91, the second and third clutches C2 and C3 are arranged on a second countershaft 92, and the fourth clutch C4 is arranged on an output shaft 93.

The forward low-speed clutch FL and the first clutch C1 are engaged during the forward 1 speed. In this state, the output part of the reverse clutch R is rotating in the direction reverse to the rotation of the forward low-speed clutch FL. Therefore, the reverse clutch R can be made to function as the braking clutch by causing the reverse clutch R to be engaged.

Example 2

Figure 6:
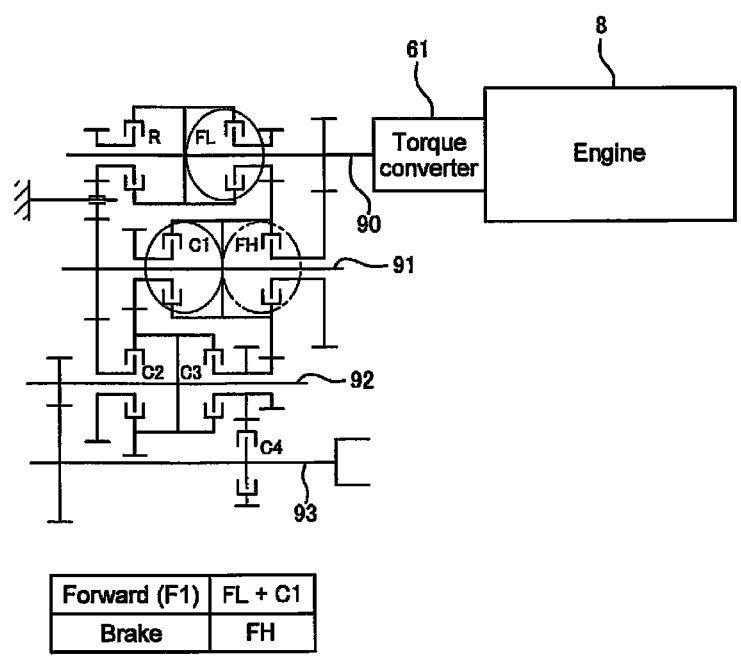
FIG. 6 illustrates another aspect of a braking clutch.

The example in FIG. 6 is similar to example 1 in FIG. 5 and has the forward low-speed clutch FL, the forward high-speed clutch FH, and the reverse clutch R as the forward-reverse shifting clutches, and the first to fourth clutches C1 to C4 as speed stage switching clutches. The arrangements of the clutches are the same as those illustrated in FIG. 5.

In example 2, the forward low-speed clutch FL and the first clutch C1 are engaged during the forward 1 speed. In this state, the output part of the forward high-speed clutch FH is rotating at an rpm lower than that of the input part of the first clutch C1. Therefore, the forward high-speed clutch FH can be made to function as the braking clutch by causing the forward high-speed clutch FH to be engaged.

Example 3

Figure 7:
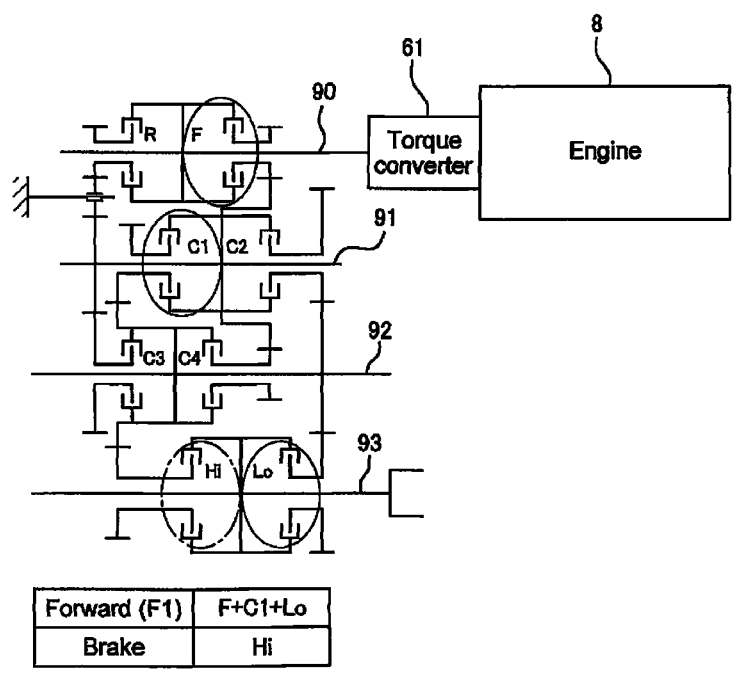
FIG. 7 illustrates still another aspect of a braking clutch.

The clutch configuration and arrangement in the example illustrated in FIG. 7 are different from those of examples 1 and 2. In example 3, the forward clutch F and the reverse clutch R are provided as the forward-reverse shifting clutches, and a low-speed clutch Lo and a high-speed clutch Hi are provided in addition to the first to fourth clutches C1 to C4 as the speed stage switching clutches. The speed stages of forward speed 8 and reverse speed 8 are obtained. The forward low-speed clutch FL and the reverse clutch R are arranged on the input shaft 90, the first and second clutches C1 and C2 are arranged on the first countershaft 91, the third and fourth clutches C3 and C4 are arranged on the second countershaft 92, and the low-speed clutch Lo and the high-speed clutch Hi are arranged on the output shaft 93.

In example 3, the forward clutch F, the first clutch C1, and the low-speed clutch Lo are engaged during the forward 1 speed. In this state, the output part of the high-speed clutch Hi is rotating at an rpm lower than that of the input part of the low-speed clutch Lo. Therefore, the high-speed clutch Hi can be made to function as the braking clutch by causing the high-speed clutch Hi to be engaged.

Very Low-Speed Control (1)

A very low-speed control (1) will be described with reference to the flow chart in FIG. 8. The very low-speed control is started by pressing the vehicle speed adjusting knob 21 in the operating unit 25. The vehicle speed during the very low-speed travel can be set freely by turning the vehicle speed adjusting knob 21.

The very low-speed travel signifies traveling at a vehicle speed equal to or lower than the vehicle speed of the forward 1 speed (e.g., 1.3 km/h) at a low idle rpm as described above. The reverse clutch R is used as the braking clutch as described in example 1 illustrated in FIG. 5.

First in step S1, the selection of the very low-speed control by the operator is confirmed. In step S2, data of the very low-speed travel vehicle speed (set vehicle speed) V0 set with the vehicle speed adjusting knob 21 is read.

In step S3, the following various numerical values are read with respect to the set vehicle speed V0.

Target vehicle speeds Va1, Va2: a range of a certain vehicle speed relative to the set vehicle speed V0 (maximum vehicle speed=Va1, minimum vehicle speed=Va2)

Maximum oil pressure Prmax of reverse clutch R
Minimum oil pressure Prmin of reverse clutch R
Oil pressure increase amount ΔPra of reverse clutch R
Oil pressure decrease amount ΔPrb of reverse clutch R The clutch oil pressure Pr of the reverse clutch R is set to Prmax as the initial setting in step S4. The idle engine rpm N is set to N0.

In step S5, pressure oil is supplied to the reverse clutch R (braking clutch). In step S6, it is determined whether or not the oil chamber of the reverse clutch R is filled with the pressure oil. Whether or not the oil chamber of the reverse clutch R is filled is detected by a fill detection switch (not illustrated).

When the fill switch is ON, the routine moves from step S6 to step S7. In step S7, it is determined whether or not the starting conditions of the very low-speed control have been established. The starting conditions of the very low-speed control are established when the following conditions are all met.

The accelerator pedal is OFF (pressing amount=0)
The forward 1 speed is selected.
The inching pedal is OFF (pressing amount=0)
The mode (torque converter mode) for transmitting the motive force via the torque converter is selected.

The routine moves to step S8 when the above starting conditions are not met and the very low-speed control processing is released. In step S9, the engine rpm is set as the idle rpm N0, and the clutch oil pressure Pr for the reverse clutch R is set to "0," which is a non-engagement state, and the routine returns to step S1.

Conversely, when the above starting conditions are met, the routine moves from step S7 to step S10. In step S10, a measurement result of the vehicle speed V is read. In step S11, a judgment is made as to whether the read vehicle speed V is above the target maximum vehicle speed Va1.

When Vehicle Speed V is High

If the vehicle speed V is higher than the target maximum vehicle speed Va1, the braking force is increased because there is a need to reduce the vehicle speed, and the routine moves from step S11 to step S12. In step S12, the current oil pressure Pr of the reverse clutch R is increased by the amount of ΔPra. As a result, the transmission power of the reverse clutch R is increased so that the braking force increases and the vehicle speed decreases.

In step S13, a confirmation is made as to whether or not the changed oil pressure Prg of the reverse clutch R has exceeded the maximum oil pressure Prmax of the reverse clutch R. When the oil pressure Prg has not exceeded the maximum oil pressure Prmax, the routine moves from step S13 to step S7 and the above processing is repeated.

At this time, the vehicle speed may not decrease even when the oil pressure of the reverse clutch R has been raised and the braking force increased while traveling on a downward slope or while the work load is light. In this case, the oil pressure Prg rises to meet or exceed the maximum oil pressure Prmax when the steps S7 to S13 are repeated. When the oil pressure Prg is equal to or greater than the maximum oil pressure Prmax, the routine moves from step S13 to step S14. In step S14, the oil pressure of the reverse clutch R is set to the maximum oil pressure Prmax and the routine returns to step S7. The very low-speed travel is continued at a vehicle speed equal to or above the target maximum vehicle speed Va1 in a state in which the maximum set braking force of the reverse clutch R is activated.

When the maximum oil pressure Prmax of the reverse clutch R becomes too high, clutch plates and the like of the reverse clutch R or the clutches (the forward low-speed clutch FL and the first clutch C1) engaged during the forward 1 speed may be damaged. Therefore, priority is given to preventing the oil pressure of the reverse clutch R from exceeding the maximum oil pressure Prmax rather than preventing the vehicle speed from exceeding the target maximum vehicle speed Va1.

When Vehicle Speed V is Low

When the vehicle speed V is lower than the target maximum vehicle speed Va1, the routine moves from step S11 to step S15. In step S15, a judgment is made as to whether the vehicle speed V is higher than a target minimum vehicle speed Va2. When the vehicle speed V is higher than the target minimum vehicle speed Va2, the vehicle speed V is a suitable vehicle speed and the routine moves from S15 to S16 to maintain the clutch oil pressure of the reverse clutch R as-is, and the routine returns to step S7.

Conversely, when the vehicle speed V is equal to or lower than the target minimum vehicle speed Va2, the braking force is reduced because there is a need to raise the vehicle speed, and the routine moves to step S17. In step S17, the current oil pressure Pr of the reverse clutch R is decreased by the amount of ΔPrb. As a result, the transmission power of the reverse clutch R is decreased so that the braking force decreases and the vehicle speed increases.

In step S18, a confirmation is made as to whether or not the changed oil pressure Prg of the reverse clutch R has exceeded the minimum oil pressure Prmin of the reverse clutch R. When the oil pressure Prg has exceeded the minimum oil pressure Prmin, the routine moves from step S18 to step S7 and the above processing is repeated.

When, for example, the work load is extremely large, the vehicle speed may not rise even when the oil pressure of the reverse clutch R is lowered and the braking force reduced. In this case, the oil pressure Prg reaches or falls below the minimum oil pressure Prmin when steps S7 to S18 are repeated. In this case, the routine moves from step S18 to step S19. In step S19, the oil pressure of the reverse clutch R is set to the minimum oil pressure Prmin and the routine returns to step S7.

When the work load is extremely large and the vehicle speed is not inside the target range even when the braking force is reduced with the reverse clutch R, processing is conducted, for example, to reduce the oil pressure supplied to the reverse clutch R to "0".

Timing Chart of Very Low-Speed Control (1)

Figure 9:
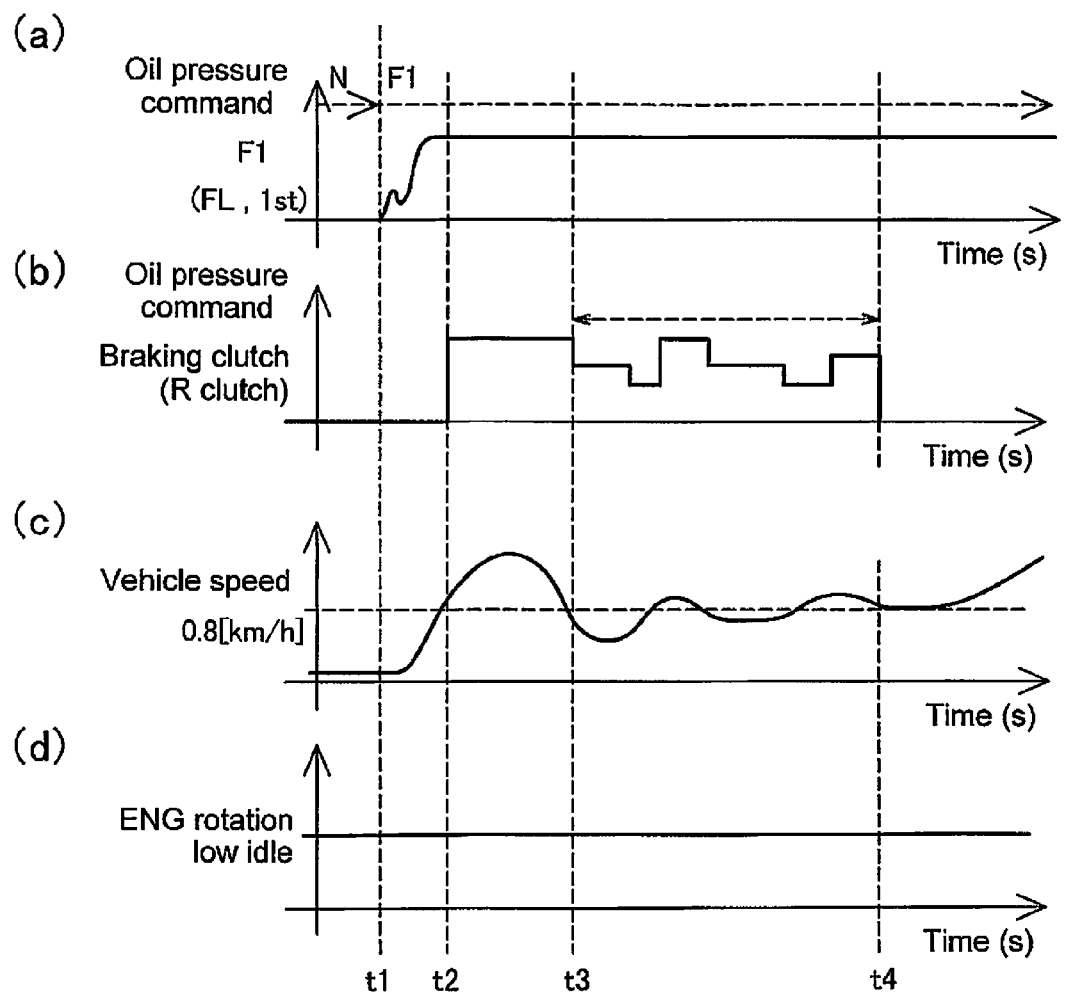
FIG. 9 is a timing chart of the very low-speed control (1).

FIG. 9 illustrates (a) changes in the hydraulic command values to the forward 1 speed clutches, (b) changes in the hydraulic command values to the braking clutch (reverse clutch R), (c) changes in vehicle speed, and (d) changes in the engine rpm when the above processing is executed. In the very low-speed control (1), the engine rpm is maintained at a low idle rpm. The following examples represent a case where the vehicle speed for the very low-speed travel is set to 0.8 km/h. When the vehicle speed is set to a vehicle speed of 0.8 km/h (V0), the target vehicle speeds Va1 and Va2 are set respectively to 0.6 and 1.0 km/h.

First, when the forward 1 speed (F1) is selected at a time t1, a certain clutch oil pressure is supplied to the forward low-speed clutch FL and the first clutch C1 as the forward 1 speed clutches. Consequently, the vehicle speed rises toward an average vehicle speed (e.g., 1.3 km/h) for the forward 1 speed during the low idle rpm.

When a command to start the very low-speed travel is issued at a time t2, the maximum oil pressure Prmax is sent as a command value to the reverse clutch R acting as the braking clutch. As a result, the vehicle speed begins to decrease after the time 2. A time t3 is a point in time when the fill detection sensor of the reverse clutch R turns ON. At this point in time, the hydraulic command value to the reverse clutch R is lowered and the braking force is weakened because the vehicle speed decreases to fall below 0.6 km/h. As a result the vehicle speed increases. Furthermore, when the braking force is weakened and the vehicle speed exceeds 1.0 km/h, the hydraulic command value to the reverse clutch R is raised and the braking force is strengthened.

Due to the above feedback processing (time t3 to time t4), the very low-speed control is conducted so that the vehicle speed approaches the set vehicle speed of 0.8 km/h.

When a finish command of the very low-speed control is received, the hydraulic command value to the reverse clutch R becomes "0" and the vehicle speed rises to 1.3 km/h.

Very Low-Speed Control (2)

While conducting work using the very low-speed control (1) as described above, the vehicle may need to climb a slope. In this case, the vehicle speed often does not reach the vehicle speed set with the vehicle speed adjusting knob 21, tractive force falls remarkably, and workability also falls.

Figure 10A:
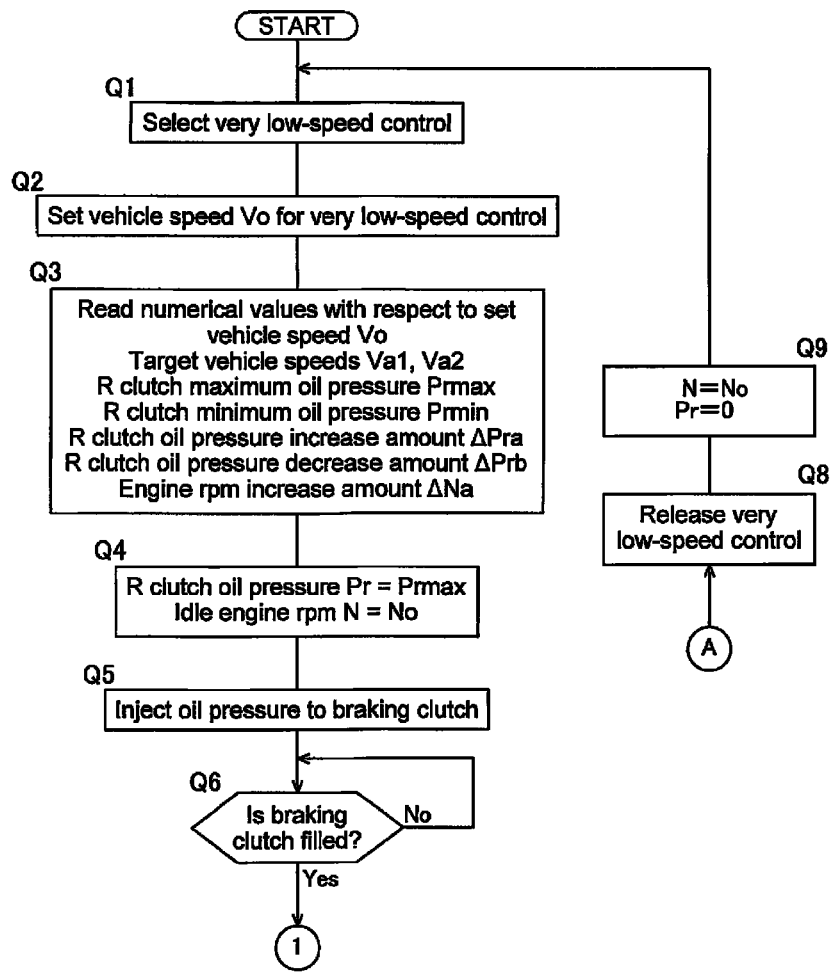
FIG. 10A is a flow chart of a very low-speed control (2).
Figure 10B:
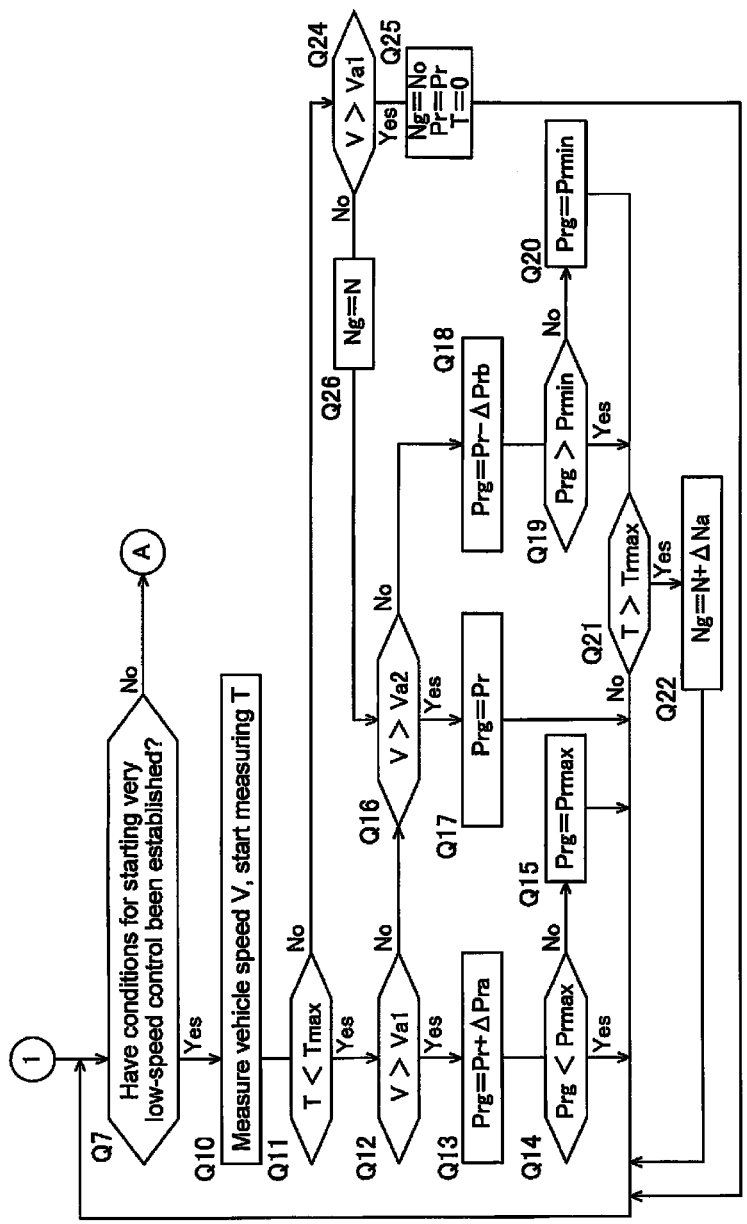
FIG. 10B is a flow chart of the very low-speed control (2).

Accordingly, to obtain the desired vehicle speed under the above conditions, a very low-speed control (2) as illustrated in FIG. 10 is required instead of the abovementioned very low-speed control (1). The following is an explanation of the very low-speed control (2).

Figure 8A:
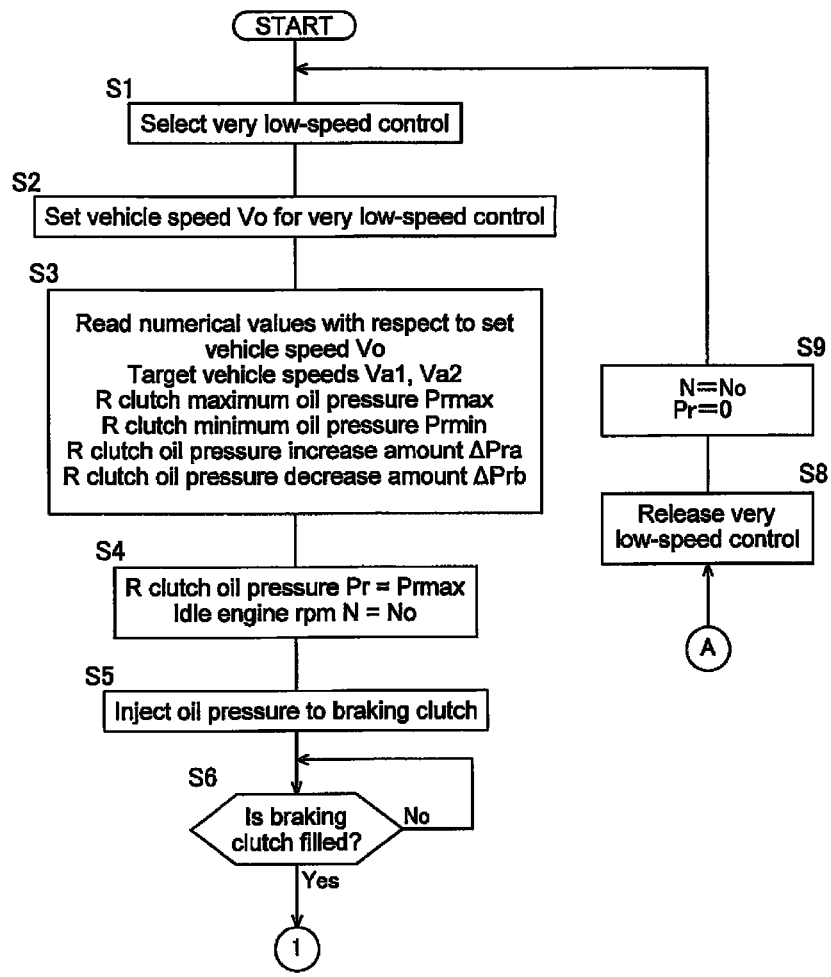
FIG. 8A is a flow chart of a very low-speed control (1).
Figure 8B:
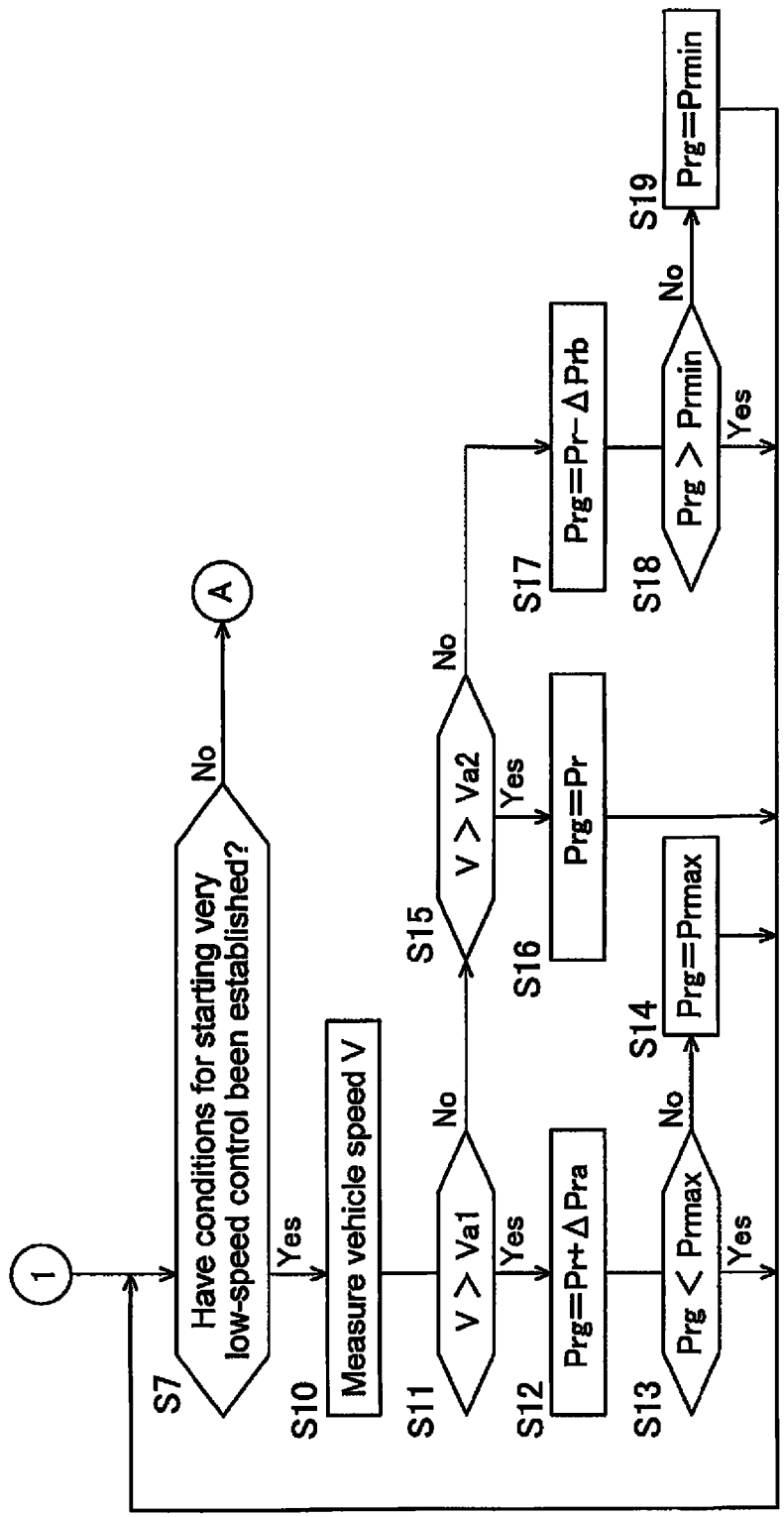
FIG. 8B is a flow chart of the very low-speed control (1).

The processing from step Q1 to step Q10 in the flow chart in FIG. 10 is similar to the processing from step S1 to step S10 in FIG. 8 except for step Q3 and step Q10, and an explanation of similar processing is omitted. In step Q3, the numerical value "engine rpm increase amount ΔNa" is read in addition to the numerical values read in step S3.

When the very low-speed control starting conditions are established at step Q7, the vehicle speed V is measured and measuring for a processing time period T is started at step Q10. Then, a judgment is made in step Q11 as to whether the processing time period T has exceeded a maximum time period Tmax.

The processing time period T is a time period in which processing is repeated without the vehicle speed V reaching the target minimum vehicle speed Vat. Specifically, the processing time period T corresponds to the time period in which step S7, step S10, step S11, step S15, step S17, step S18, and step S19 in FIG. 8 are repeated. In FIG. 10, the processing time period T is the time period in which step Q7, step Q10, step Q11, step Q12, step Q16, step S18, step S19, and step S20 are repeated. Moreover, the processing time period T represents below-mentioned times t2 to t4 in FIG. 11.

When the processing time period T has not reached the maximum time period Tmax, the routine moves from step Q11 to step Q12.

When Vehicle Speed V is High

The processing from step Q12 to step Q15 is the same as the processing from step S11 to step S14 in FIG. 8.

Specifically, when the vehicle speed V is higher than the target maximum vehicle speed Va1, the current oil pressure Pr of the reverse clutch R is increased by ΔPra (step Q13), and the braking force is increased and the vehicle speed is decreased. A confirmation is made as to whether the changed oil pressure Prg of the reverse clutch R has not exceeded the maximum oil pressure Prmax of the reverse clutch R (step Q14). When the oil pressure Prg has not exceeded the maximum oil pressure Prmax, the processing is repeated. When the oil pressure Prg reaches or exceeds the maximum oil pressure Prmax, the oil pressure of the reverse clutch R is set to the maximum oil pressure Prmax (step Q15), and the routine returns to step Q7.

When Vehicle Speed V is Low

The processing from step Q16 to step Q20 is the same as the processing from step S15 to step S19 in FIG. 8.

Specifically, when the vehicle speed V is lower than the target maximum vehicle speed Va1, a determination is made as to whether the vehicle speed V is higher than the target minimum vehicle speed Va2 (step Q16). When the vehicle speed V is higher than the target minimum vehicle speed Va2, the clutch oil pressure of the reverse clutch R is maintained as-is (step Q17), and the routine returns to step Q7.

Conversely, when the vehicle speed V is equal to or less than the target minimum vehicle speed Va2, the current oil pressure Pr of the reverse clutch R is reduced by ΔPrb (step Q18), and the braking force is reduced and the vehicle speed is increased. A confirmation is made as to whether the changed oil pressure Prg of the reverse clutch R has not exceeded the minimum oil pressure Prmin of the reverse clutch R (step Q19). When the oil pressure Prg has exceeded the minimum oil pressure Prmin, the routine moves to step Q21.

When the above processing is repeated and the oil pressure Prg reaches or falls below the minimum oil pressure Prmin, the oil pressure of the reverse clutch R is set to the minimum oil pressure Prmin (step Q20), and the routine moves to step Q21.

In step Q21, a determination is made as to whether the processing time period T has exceeded the maximum time period Tmax. The processing time period T and the maximum time period Tmax are described above.

As described in the very low-speed control (1), if, for example, the work load is large or the vehicle is traveling up a slope during the very low-speed travel, the vehicle speed may not increase even when the oil pressure of the reverse clutch R is reduced and the braking force is decreased. In this case, the oil pressure Prg reaches or falls below the minimum oil pressure Prmin when steps Q7 to Q18 are repeated, and the oil pressure of the reverse clutch R is set to the minimum oil pressure Prmin in step Q20. However, the vehicle speed does not reach the set vehicle speed even if this processing is continued.

Accordingly, when the processing time period T exceeds the maximum time period Tmax, the routine moves from step Q21 to step Q22. In step Q22, the engine rpm is raised by ΔNa and the routine returns to step Q7 and the above processing is repeated. In this case, the engine rpm is raised from the low idle rpm by the amount ΔNa. Therefore, the vehicle speed approaches the set vehicle speed.

Accordingly, when the processing time period T exceeds the maximum time period Tmax in step Q11, the routine moves from step Q11 to step Q24. In step Q24, a determination is made as to whether the measured vehicle speed V has exceeded the target maximum vehicle speed Va1. The vehicle speed V exceeding the target maximum vehicle speed Va1 signifies that the vehicle speed V has reached a speed higher than the target range due to the increase in the engine rpm due to the previous processing. In this case, the routine moves from step Q24 to step Q25. In step Q25, the engine rpm is returned to the low idle rpm N0 and the supply oil pressure to the reverse clutch R is maintained at the current oil pressure Pr. In step Q25, the processing time period T is reset. The routine then returns to step Q7 and the processing is repeated.

The determination that the vehicle speed V is equal to or below the target maximum vehicle speed Va1 in step Q24 signifies that the vehicle speed V has reached a vehicle speed within the target range due to the engine rpm being increased due to the previous processing. In this case, the routine moves from step Q24 to step Q26. In step Q26, the engine rpm is maintained at the same rpm, and the routine moves to step Q16. The subsequent processing is the same as the abovementioned processing.

Timing Chart of Very Low-Speed Control (2)

Figure 11:
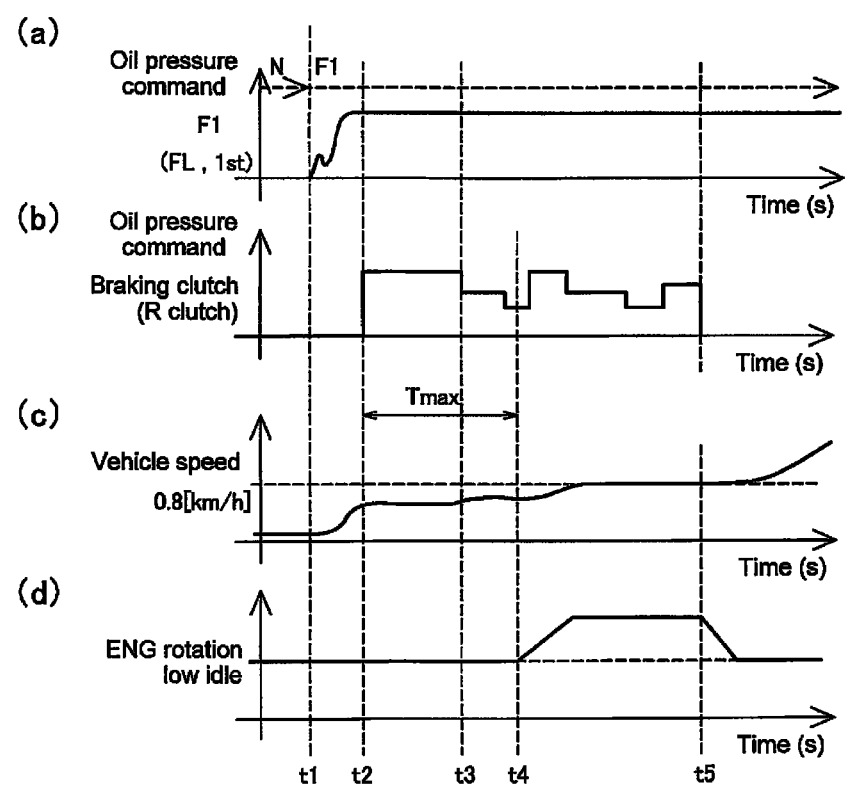
FIG. 11 is a timing chart of the very low-speed control (2).

FIG. 11 illustrates (a) changes in the hydraulic command values to the forward 1 speed clutches, (b) changes in the hydraulic command values to the braking clutch (reverse clutch R), (c) changes in vehicle speed, and (d) changes in the engine rpm when the above processing is executed. Similar to the abovementioned examples, a vehicle speed of 0.8 km/h is set as the vehicle speed for very low-speed travel, and the target vehicle speeds Va1 and Va2 are set respectively to vehicle speeds of 0.6 km/h and 1.0 km/h.

The hydraulic command values to the clutches for the forward 1 speed are the same as in the abovementioned examples. Therefore, the vehicle speed is made to rise toward an average vehicle speed (e.g., 1.3 km/h) for the forward 1 speed under the low idle rpm. However, the vehicle speed is not able to rise up to 1.3 km/h as illustrated in FIG. 11(c) under the conditions of a large load, such as when climbing a slope.

When a command to start the very low-speed travel is issued at the time t2, the maximum oil pressure Prmax is sent as a command value to the reverse clutch R acting as the braking clutch. While the fill detection sensor of the reverse clutch R turns ON at the time t3, the vehicle speed remains the same at this point in time. Accordingly, the hydraulic command value to the reverse clutch R is lowered and the braking force is weakened.

However, since the vehicle speed does not rise, the hydraulic command value to the reverse clutch R is reduced still further until the minimum oil pressure Prmin is reached. At the time t4, the processing time period T reaches the maximum time period Tmax and, as a result, the engine rpm is raised from the low idle rpm by a certain rpm (see FIG. 11(d)).

While the engine rpm is being raised as described above, the hydraulic command value to the reverse clutch R is raised and lowered and the feedback processing is conducted. As a result, the vehicle speed approaches the set vehicle speed of 0.8 km/h. The increase in the engine rpm is stopped at the point in time that the vehicle speed reaches the set vehicle speed or falls within the target vehicle speed range.

When the finish command of the very low-speed control is issued at the time t5, the hydraulic command value to the reverse clutch R becomes "0" and the engine rpm is returned to the low idle rpm.

Characteristics

The vehicle speed during very low-speed travel can be freely set with the use of the vehicle speed adjusting knob 21. As a result, a suitable vehicle speed can be constantly obtained in accordance with the work conditions.

The reverse clutch R is used as the braking clutch during the very low-speed travel. As a result, a relative rpm differential between the travel clutch and the braking clutch increases and a large braking effect can be obtained with a low oil pressure.

When the target vehicle speed is not met after the processing time period has exceeded a certain time period in the very low-speed control (2), the vehicle speed can approach the set vehicle speed even when the load is large because the engine rpm is increased and the very low-speed travel is implemented. Therefore, work efficiency is improved.

OTHER EXEMPLARY EMBODIMENTS

The present invention is not limited to the above exemplary embodiments and various changes and modifications may be made without departing from the spirit of the invention.

The various numerical values in the exemplary embodiments are examples and are not limited to those indicated in the exemplary embodiments.

While the reverse clutch is used as the braking clutch in the exemplary embodiment, another clutch may be used as the braking clutch as depicted in example 2 and example 3. When a clutch in which the relative rpm differential is small compared to a travel clutch is used as the braking clutch, the braking effect with respect to the change in the oil pressure to the braking clutch is small but there is no need to precisely manage the oil pressure for braking and thus the breadth of the control is increased and the control is facilitated.

In the motor grader of the exemplary embodiments of the present invention, work can be performed at a suitable vehicle speed in accordance with the work conditions while traveling at a very low speed. In another exemplary embodiment of the present invention, a set vehicle speed can be obtained and a loss of tractive force can be prevented and a reduction in work efficiency can be suppressed even when a large load exists while the motor grader is traveling at a very low speed.

What is claimed is:

1. A motor grader comprising:
   an engine;
   front and rear travel wheels;
   a transmission including a plurality of hydraulic clutches configured to switch between forward and reverse travel and to switch between speed stages, to change speed stages of a motive force from the engine, and to transmit the motive force to at least one of the front and rear travel wheels;
   a work implement including a blade configured to grade;
   a control unit configured to control the hydraulic clutches with command signals, the control unit being configured to execute a very low-speed control in which one of the hydraulic clutches of the transmission is operated as a braking clutch to enable a very low-speed travel when traveling at a forward low-speed stage, the one of the hydraulic clutches operated as braking clutch being operated in double engagement with another of the hydraulic clutches that is engaged to achieve the forward low-speed stage; and
   a very low-speed adjusting member configured to adjustably set a vehicle speed during the very low-speed travel to an arbitrary vehicle speed.

2. The motor grader according to claim 1, wherein the very low-speed control of the control unit is configured to operate a reverse hydraulic clutch as the braking clutch.

3. The motor grader according to claim 1, wherein the transmission has a forward low-speed hydraulic clutch and a forward high-speed hydraulic clutch; and the very low-speed control of the control unit is configured to engage the forward low-speed hydraulic clutch and a hydraulic clutch for switching between speed stages and to operate the forward high-speed hydraulic clutch as the braking clutch when traveling at a forward 1 speed.

4. The motor grader according to claim 1, further comprising
   a vehicle speed sensor configured to detect a vehicle speed; wherein
   the very low-speed control of the control unit is configured to control a supply oil pressure to the braking clutch, on the basis of a detection result of the vehicle speed sensor, so that the vehicle speed becomes a target vehicle speed within a prescribed range that includes a set vehicle speed set with the very low-speed adjusting member.

5. The motor grader according to claim 4, wherein:
the very low-speed control of the control unit is configured to raise an engine rpm when the vehicle speed does not reach the target vehicle speed even when the supply oil pressure to the braking clutch is equal to or less than a certain oil pressure.

6. The motor grader according to claim 5, wherein:
the very low-speed control of the control unit is configured to raise the engine rpm when the vehicle speed does not meet the target vehicle speed within a certain processing time period even when the supply oil pressure to the braking clutch is equal to or less than the certain oil pressure.

7. The motor grader according to claim 2, further comprising:
a vehicle speed sensor configured to detect a vehicle speed; wherein
the very low-speed control of the control unit is configured to control a supply oil pressure to the braking clutch, on the basis of a detection result of the vehicle speed sensor, so that the vehicle speed becomes a target vehicle speed within a prescribed range that includes a set vehicle speed set with the very low-speed adjusting member.

8. The motor grader according to claim 7, wherein:
the very low-speed control of the control unit is configured to raise an engine rpm when the vehicle speed does not reach the target vehicle speed even when the supply oil pressure to the braking clutch is equal to or less than a certain oil pressure.

9. The motor grader according to claim 8, wherein:
the very low-speed control of the control unit is configured to raise the engine rpm when the vehicle speed does not meet the target vehicle speed within a certain processing time period even when the supply oil pressure to the braking clutch is equal to or less than the certain oil pressure.

10. The motor grader according to claim 3, further comprising:
a vehicle speed sensor configured to detect a vehicle speed; wherein
the very low-speed control of the control unit is configured to control a supply oil pressure to the braking clutch, on the basis of a detection result of the vehicle speed sensor, so that the vehicle speed becomes a target vehicle speed within a prescribed range that includes a set vehicle speed set with the very low-speed adjusting member.

11. The motor grader according to claim 10, wherein:
the very low-speed control of the control unit is configured to raise an engine rpm when the vehicle speed does not reach the target vehicle speed even when the supply oil pressure to the braking clutch is equal to or less than a certain oil pressure.

12. The motor grader according to claim 11, wherein:
the very low-speed control of the control unit is configured to raise the engine rpm when the vehicle speed does not meet the target vehicle speed within a certain processing time period even when the supply oil pressure to the braking clutch is equal to or less than the certain oil pressure.

13. The motor grader according to claim 1, wherein
the very low-speed adjusting member is configured to adjust the vehicle speed to any vehicle speed equal to or below a vehicle speed that can be achieved with the transmission in the forward low-speed stage and the engine operating at a low idle speed.

14. The motor grader according to claim 13, wherein
the very low-speed adjusting member is configured to adjust the vehicle speed to any vehicle speed equal to or below 1.3 km/hr.

* * * * *